Nov. 3, 1936.                C. D. ELLIS                2,059,937
                                TRAP
                         Filed April 10, 1935
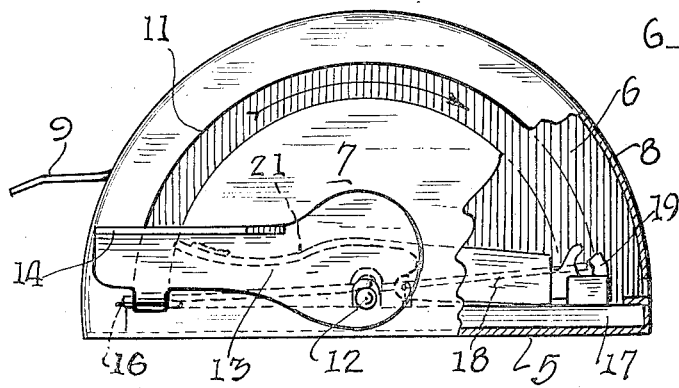
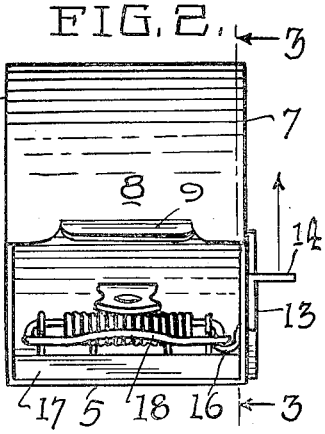
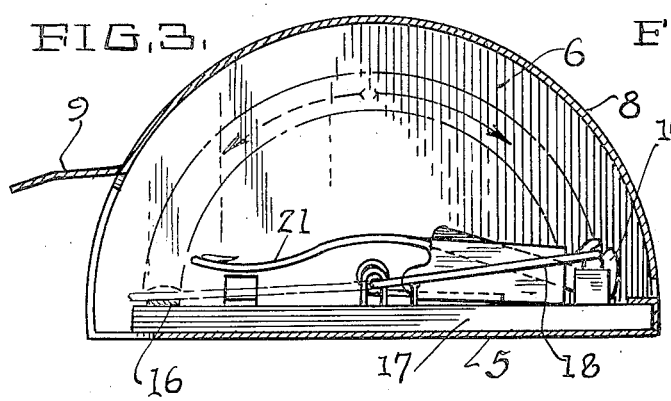
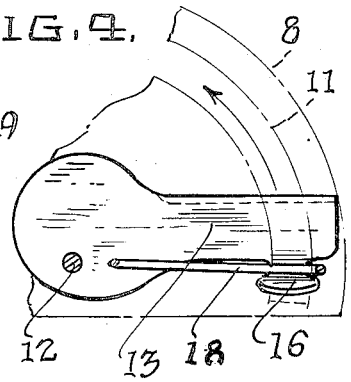
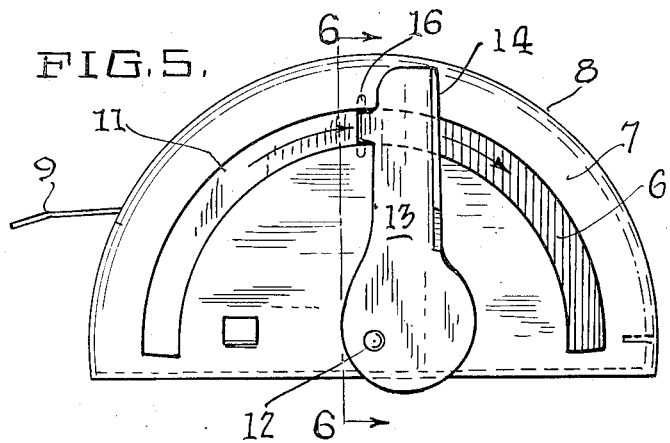
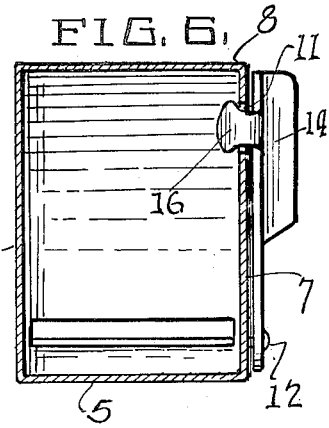
INVENTOR.
CHARLES D. ELLIS.
BY
ATTORNEYS.

Patented Nov. 3, 1936

2,059,937

UNITED STATES PATENT OFFICE 2,059,937

TRAP

Charles D. Ellis, San Mateo, Calif.

Application April 10, 1935, Serial No. 15,650

1 Claim. (Cl. 43—81)

This invention relates to improvements in mouse traps and has particular reference to a mouse trap wherein the danger of hurting the fingers of the operator is entirely eliminated.

A further object is to produce a device wherein the caught rodent may be discharged from the trap without touching said rodent.

A further object is to produce a device which is simple to construct and one in which the ordinary mouse trap principles are included.

A still further object is to produce a device which may be employed in combination with the usual mouse trap of the spring type.

Other objects and advantages will be apparent during the course of the following description.

In the accompanying drawing forming a part of this specification and in which like numerals are employed to designate like parts throughout the same, Fig. 1 is a side elevation of my device with a portion thereof broken away, Fig. 2 is an end elevation looking from the left of Fig. 1, Fig. 3 is a vertical cross section on the line 3—3 of Fig. 2, Fig. 4 is a fragmentary detail view of the lever engagement with the trap impinging element, Fig. 5 is a side elevation similar to Fig. 1, showing the setting lever moved toward the right of the drawing, as the same would move in the setting of the trap, and Fig. 6 is a cross sectional view on the line 6—6 of Fig. 5.

The ordinary mouse trap consists of a small base member having a coiled spring mounted thereon, a portion of the spring being formed into an impinging element which is engaged by a latch and so held until a trigger mechanism releases the latch at which time the impinging element moves through an arc and strikes the object being trapped, the blow resulting either in sudden death or death by strangulation. These traps are very successful in accomplishing the object for which they are designed. The difficulty of them, however, is that they are extremely delicate as regards the latching mechanism and consequently it is difficult to place the bait upon the trigger and to set the trap so that the latch will hold while the fingers are being removed from the setting operation. Many persons have had their fingers badly pinched by traps of this character. Also if the trap has been in use sometime it is liable to be soiled from the animals caught and as a result many persons do not care to handle the traps after use and consequently their period of use is very short. Applicant has designed a holder for a trap of this character which overcomes all these difficulties.

In the accompanying drawing wherein for the purpose of illustration is shown a preferred embodiment of my invention, the numeral 5 designates the bottom of a substantially semi-circular housing formed by the bottom 5, sides 6 and 7 and a semi-circular portion 8. The semi-circular portion has a lip 9 extending outwardly therefrom, the purpose of which will be later seen. The side 7 has a slot 11 formed therein and also has pivoted thereto as at 12 a lever 13 having a thumb piece 14 and an extension 16, which extends through the slot 11. Mounted upon the bottom of the device is an ordinary mouse trap having a base 17 and a spring actuated impinging element 18. A latch is shown at 19 and a trigger at 21. The extension 16, when the lever 13 is in the position of Fig. 1, underlies the side of the impinging element 18. Consequently when this lever is moved about its pivot 12 in the direction of the arrow of Fig. 1, the extension 16 will move the impinging element from the dotted line position of Fig. 3 to the full line position of this figure, at which time it will be engaged by the latch 19. It is, of course, obvious that the trigger 21 is baited previous to this setting of the trap. The lever may or may not be returned to its starting position for the reason that the spring of the trap will be sufficient to move the lever 13 back to its initial position when the trap is sprung. When the rodent encounters the bait upon the trigger, the latch mechanism will be released and the impinging element will be thrown forcibly from the full line position of Fig. 3 to the dotted line position, thus striking the rodent a severe blow which is usually sufficient to kill.

When it is desired to release the rodent the device as a whole is picked up and the thumb piece moved so as to release the impinging element from its contact upon the rodent and the rodent will be shaken loose and will be dropped therefrom. The trap can then again be set without contacting any portion of the device which has already contacted the animal.

It is obvious that the trap here employed, formed no part of my invention and is merely illustrative of the principle of my device. This trap is retained in my device in any convenient manner. In the present instance I have shown a portion of the enclosure bent so as to engage the base 17.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, the combination with a mouse trap having a base and a pivoted impinging element mounted thereon, said impinging element having an actuating spring, a latch capable of retaining said impinging element against the tension of said spring, a casing secured to the base of said trap, the upper portion of said casing being semi-circular to conform to the path of movement of said impinging element, a slot formed in the side of said casing, and a lever pivoted to said casing and having an arm extending through said slot and engaging said impinging element whereby actuation of said lever will move said impinging element against the tension of its spring and into engagement with said latch.

CHARLES D. ELLIS.